United States Patent [19]  [11] 4,367,160
Rooks et al.  [45] Jan. 4, 1983

[54] OXIDANTS FOR GASIFYING CARBON-CONTAINING MATERIALS

[75] Inventors: Charles W. Rooks, Houston, Tex.; George D. Davis, Creve Coeur, Mo.; James C. Hill, St. Louis, Mo.; Talmage D. McMinn, Jr., Des Peres, Mo.

[73] Assignee: Monsanto Company, St. Louis, Mo.

[21] Appl. No.: 309,318

[22] Filed: Oct. 7, 1981

Related U.S. Application Data

[63] Continuation-in-part of Ser. No. 213,983, Dec. 8, 1980, abandoned, which is a continuation of Ser. No. 77,692, Sep. 21, 1979, abandoned.

[51] Int. Cl.$^3$ .............................................. C07C 1/02
[52] U.S. Cl. .................................. 252/373; 518/702; 518/709
[58] Field of Search ................ 518/702, 709; 252/373

[56] References Cited

U.S. PATENT DOCUMENTS 2,602,809  7/1952  Dickinson ........................... 518/709

*Primary Examiner*—Alan Siegel
*Attorney, Agent, or Firm*—Wendell W. Brooks; James C. Logomasini; Arnold H. Cole

[57] ABSTRACT

This invention relates to the treatment of carbon-containing materials. In one aspect this invention relates to the treatment of carbon-containing materials, such as coal, coke and hydrocarbons to produce oxides of carbon therefrom. In still another aspect, this invention relates to a process for the production of high purity synthesis gas, a mixture of hydrogen and carbon monoxide, from carbon-containing materials. More specifically, this invention relates to inorganic metal-oxygen containing materials useful as the oxidant, oxygen carrier and supplier, and heat transfer agent for the endothermic oxidative gasification of carbon-containing materials.

10 Claims, No Drawings

OXIDANTS FOR GASIFYING CARBON-CONTAINING MATERIALS

CROSS-REFERENCE TO RELATED APPLICATIONS

This application is a continuation-in-part of application Ser. No. 213,983 filed Dec. 8, 1980 now abandoned which is a continuation application of Ser. No. 077,692 filed Sept. 21, 1979, now abandoned.

Solid carbon-containing materials, such as coal and coke may be treated with oxygen and/or steam at relatively high temperatures to form hydrogen and carbon monoxide. Such products are useful for various purposes including the syntheses of organic compounds therefrom. The use of steam alone to gasify coal or coke requires heat from an external source. Use of purified oxygen is expensive and if the oxygen is supplied by use of air, the economic advantage obtained by using air is obviated by the fact that product gas contains large amounts of diluent nitrogen. Gasifying coal with relatively pure oxygen releases heat and as a result, steam and oxygen have normally been used together in such proportions that the net reaction heat is sufficient to maintain the desired temperatures for the gasification of the coal or coke.

Over the years, art has developed on the use of inert particular materials such as alumina, metals, alloys, sand and the like as heat carriers for the gasification of carbonaceous solids. For example, U.S. Pat. No. 3,850,839 employs inert refractory pebbles as a heat source for the gasification of carbonaceous solids.

U.S. Pat. No. 2,602,809 discloses the gasification of solid carbon-containing materials using metal oxides, such as $Fe_3O_4$ or $Fe_2O_3$, as the principal source of oxygen and as the heat transfer agent for the reaction. Reduced metal oxide from the gasification is re-oxidized with air to replenish the oxygen and the metal oxide is heated by heat from the exothermic air oxidation reaction.

U.S. Pat. No. 4,272,399, Ser. No. 77,706, filed Sept. 21, 1979 discloses a unified process for producing high purity synthesis gas from carbon-containing materials using a metal-oxygen containing material as the principal source of oxygen and heat transfer agent for oxidatively gasifying carbon-containing material.

SUMMARY

This invention is directed to particular inorganic metal-oxygen containing materials capable of being repeatedly oxidized and reduced. The inorganic metal-oxygen containing materials of this invention can be characterized as oxygen carriers and are herein referred to generally as oxidants. The oxidants are reducible by synthesis gas to form water and carbon dioxide which are useful for the gasification of carbon-containing materials. The reduced oxidants are reoxidizable by air.

Typical objects of this invention are to provide (1) oxidants capable of releasing oxygen to a reducing atmosphere and of accepting oxygen from air, (2) oxidants capable of being repeatedly oxidized and reduced, (3) oxidants which are fluidizable and resistant to agglomeration, attrition and stickiness under operating conditions, (4) oxidants adapted to supply oxygen and transfer heat for gasifying carbon-containing materials, and (5) processes for gasifying carbon-containing materials in the presence of an oxidant as the source of oxygen and heat transfer agent for the reaction wherein heated oxidant is at least partially reduced with synthesis gas to form steam and carbon dioxide.

Various other objects, aspects and advantages of this invention will become apparent to those skilled in the art from the accompanying description and appended claims.

Oxidants, according to this invention, are inorganic metal oxygen-containing materials capable of repeatedly releasing oxygen through reduction with synthesis gas as the reducing medium and of accepting oxygen through oxidation with air without loss of oxygen acceptability and carrying capacity or oxygen releasability. Oxidants within this invention have a releasable oxygen carrying capacity of at least 0.015 pounds of oxygen per pound of oxidant ($9.375 \times 10^{-4}$ gram atoms oxygen per gram of oxidant). The oxidants are resistant to (1) agglomeration, i.e., remain fluid in a reducing medium and in an oxidizing medium at 1050° C. at a gas velocity of 0.5 feet per second, (2) stickiness, i.e., capable of free flow through a 1-inch diameter nonaerated standpipe at 1050° C., and (3) attrition resistant, i.e., rate of attrition, both physical and chemical, permits at least 100 reduction/oxidation cycles while retaining 0.015 pounds oxygen-carrying capacity per pound of oxidant. For economic viability in the gasification of carbon-containing materials, the oxygen releasability rate of oxidants within this invention at the conditions of use will be such to remove 0.005 pounds of oxygen per pound of oxidant ($3.125 \times 10^{-4}$ gram atoms of oxygen per gram of oxidant) per minute at an oxidant-reducing medium contact time of 1 second.

Suitable natural occurring materials useful as oxidants in accordance with this invention are certain ores, i.e., bauxites such as Engelhard Mineral & Chemicals Bauxites (Regular—16 wt. % $Fe_2O_3$ and Enriched—27.10 wt. % $Fe_2O_3$), ilmenites, such as C. E. Minerals ilmenite sand (23.7 wt. % $Fe_2O_3$), Iron chromite ore from the Transuaal Mine in South Africa (27.72 wt. % $Fe_2O_3$—45.07 wt. % $Cr_2O_3$) and Gabon A Manganese Ore (83.15 wt. % $MnO_2$).

Contrary to the teaching of the prior art with respect to natural metal oxide-containing materials, it is found that the iron content of the material is critical for use as an oxidant in the gasification of carbon-containing materials. Ores with iron concentrations above 30 wt. %, agglomerate at temperatures above 900° C. and those below 14 wt. % do not provide sufficient oxygen carrying capacity.

Within this invention, synthetic oxidants based on the metals iron, copper, nickel, manganese, cerium, uranium and cobalt are also useful. As oxidants, the metals are in the form of oxides and may be combined with a support, such as alumina, calcium aluminate and the like. As in natural occurring materials, it is found that the iron concentration level in synthetic oxidants is critical for satisfactory performance in accordance with this invention. At iron contents below 14%, the oxygen releasability is too low and above 25% the oxidants tend to defluidize under oxidation/reduction conditions. Likewise, copper-band oxidants with a copper concentration of 25% agglomerates.

As previously indicated, U.S. Pat. No. 4,272,399, Ser. No. 77,706, filed Sept. 21, 1979 discloses a unified process for the gasification of carbon-containing materials wherein an oxidant is employed as the source of oxygen and heat transfer agent for the endorthermic oxidative gasification. In this process, a three-zone system is employed wherein an oxidant, at an elevated temperature is fluidized and at least partially reduced by synthesis gas in a reducing zone with the formation of steam and carbon dioxide. The partially reduced oxidant and associated gases move under fluidized conditions to a gasification zone where contact with particulate carbon-containing material is made under conditions whereby the carbon-containing material is oxidized to carbon oxides, mainly to carbon monoxide. The gaseous effluent from the gasification zone is removed for purification and the reduced oxidant is transferred to an oxidation zone where it is contacted with air under conditions to re-oxidize and heat the oxidant. A portion of the heat liberated by the air oxidation is stored as sensible heat in the oxidant which provides heat for the reduction and gasification zones. The heated re-oxidized oxidant is returned to the reduction zone and the cycle repeated.

In the preferred method of operation of the various zones, finely divided oxidant is maintained, fluidized and continuously circulated through the reaction system. Throughout the system linear gas velocities are maintained such that the solid materials are entrained in the gases. Gas velocities above about 10 feet per second are employed for such operation. Actual gas velocities employed will be dependent upon the size, shape and densities of the solid materials employed. In this type of operation, means will be provided internally or externally of the gasification zone for separating solid materials entrained in the gaseous effluent.

The temperature employed in the reduction and gasification zones can vary over a wide range. Preferably, such reaction will be conducted from 950° C. to 1050° C. Pressure on the system can also vary. The system can be operated under pressures from 5 psig to 2000 psig.

As previously indicated, the process of this invention utilizes an upflow cocurrent fluidized system with the oxidant and carbon-containing material flowing cocurrently. The fluidization and transportation of the solids are obtained by introducing a carrier gas into the system. The carrier gas can be inert to the various reactions, but preferably is steam or synthesis gas which enters into the reactions and thus eliminates excess gas handling. The carrier gas is introduced at such rates to fluidize and transport the solids and to maintain turbulent flow of the solids in the system. Introduction of the gases at velocities of 10 to 30 ft/sec will generally be sufficient. However, this variable is dictated by the size, shape and density of the materials moving through the system.

The particle size of the carbon-containing material, if solid, and oxidant employed in the process of this invention may vary over a wide range. However, generally, the particle size will range from 50 to 200 microns.

The oxidants of the present invention are suitable for use in the gasification of carbon-containing materials as described in said U.S. Pat. No. 4,272,399 Ser. No. 77,706, filed Sept. 21, 1979, the disclosure of said application hereby being incorporated herein. Such materials are, for example, coal including lignite through anthracite, char, peat, coke, coke breeze, wood chips, kelp, hydrocarbons, for example, crude oils whole or fractions such as asphalts and vacuum residuals, shale oil, refined oils such as fuel, cycle, Bunker C and tars, chemical plant streams such as aromatic oils and heavy tars, tars from tar sands and the like.

In the above described method of gasification of carbon-containing materials as well as in other fluidized bed methods agglomeration and stickiness of oxidants under conditions of use is intolerable and renders the oxidants unsuitable.

EXAMPLES

The practice of this invention will now be more fully illustrated in the following Examples.

In the following Examples, the reactor employed for carrying out reduction of oxcars comprises a 24-inch long quartz tube with a 1.00-inch inside diameter main section fitted at eight inches from the bottom with a quartz frit for containing the oxidant and distributing the gases. The reactor is heated with a Lindberg Hevi-Duty 1½-inch inside diameter by 12 inches long, 970 watt furnace. The reactor in each example is filled with the oxidant and air is introduced at the rate of 0.5 ft/sec to fluidize the oxidant as it is heated. A ⅛ inch, Type K Inconel 600 sheathed thermocouple is immersed in the fluidized bed of oxidant. When the reaction temperature is reached, the reactor is flushed with Helium for about 2 minutes. Carbon monoxide is fed to the reactor and reaction effluent sampled and analyzed for carbon monoxide and carbon dioxide, as a measure of the oxygen released from the oxidant.

EXAMPLE 1

This Example illustrates the releasable oxygen capacity and reduction rate of Falcon siderite ore as an oxidant according to this invention. The ore is calcined at 900° C. in air and 80.0 grams is charged to the reactor. The ore is heated at 900° C. After flushing with Helium, carbon monoxide is fed at the rate of 1.09 slpm for 6 minutes. The results are given in Table 1 as Run 1a. Another Falcon siderite ore is calcined at 920° C. in air and 30 grams with 30 grams of fluidizable alpha alumina are charged to the reactor. The ore and alumina are heated to 900° C. After flushing with Helium, carbon monoxide is fed at the rate of 0.62 slpm for 12 minutes. The results are given in Table 1 as Run 1b.

EXAMPLE 2

Example 1 is repeated except that 40 grams of calcined Algoma Steel siderite ore is charged to the reactor as the oxidant, heated to 900° C. and the CO feed rate is 1.14 slpm for 12 minutes. The results are given in the Table 1.

EXAMPLE 3

Example 1 is repeated except that 40 grams of Englehard Porcel bauxite, calcined at 1100° C. in air, is charged to the reactor as the oxidant, heated to 1100° C. and the CO feed rate is 1.17 slpm for 6 minutes. The results are given in Table 1.

EXAMPLE 4

Example 1 is repeated except that 50 grams of Englehard X-1875 bauxite is charged to the reactor as the oxidant, heated to 1000° C. and the CO feed rate is 1.13 slpm for 6 minutes. The results are given in Table. 1.

EXAMPLE 5

Example 1 is repeated except that 100 grams of C. E. Minerals ilemenite is charged to the reactor as the oxidant, heated to 950° C. and the CO feed rate is 1.13 slpm for 8 minutes. The results are given in Table 1 as 5a. The reduced oxidant is then re-oxidized at 950° C. in air, heated to 1100° C. and the CO feed rate is 1.10 slpm for 10 minutes. The results are given in Table 1 as 5b.

EXAMPLE 6

Example 1 is repeated except that 100 grams of C. E. Minerals Gabon A Manganese Ore is charged to the reactor as the oxidant, heated to 1050° C. and the CO feed rate is 1.04 slpm for 10 minutes. The results are given in Table 1.

EXAMPLE 7

Example 1 is repeated except that 50 grams of C. E. Minerals iron chromite ore from the Transvaal Mine is charged to the reactor as the oxidant, heated to 1050° C. and the CO feed rate is 1.35 slpm for 9 minutes. The results are given in Table 1.

EXAMPLE 8

Example 7 is repeated except that 100 grams of the ore is charged to the reactor and hydrogen in place of CO is fed at 1.509 slpm for 7 minutes. The results are given in Table 1 as 8a. The reduced oxidant is then re-oxidized at 1050° C. in air and a 50/50 volume ratio of $H_2$ and CO is fed at 1.50 slpm for 7.5 minutes. The results are given in Table 1 as 8b.

EXAMPLE 9

Example 1 is repeated except that 50 grams of an oxidant is prepared by dry mixing 15.65 grams of copper oxide and 34.35 grams of Fisher alundum cement, the mixture is ground to a fine powder, water is added to form a viscous paste, the paste is allowed to dry at room temperature and set up, the resultant hard cake is ground to $-40/+150$ mesh and the ground oxidant is slowly heated to 1100° C. and maintained there for 2 hours. The oxidant calcined at 1150° C. in air is charged to the reactor, heated to 1050° C. and the CO feed rate is 0.978 slpm for 7 minutes. The results are given in Table 1.

EXAMPLE 10

Example 9 is repeated except that the oxidant is prepared from 12.52 grams CuO and 37.48 grams of Alcoa calcium aluminate cement and the CO feed rate is 0.974 slpm for 7 minutes. The results are given in Table 1.

EXAMPLE 11

Example 9 is repeated except that the oxidant is prepared from 12.73 grams NiO and 37.27 grams of Alcoa calcium aluminate cement and the CO feed rate is 0.950 slpm for 9 minutes. The results are given in Table 1.

EXAMPLE 12

Example 9 is repeated except that the oxidant is prepared from 25.45 grams of NiO and 24.55 grams of Alcoa calcium aluminate cement and the CO feed rate is 1.00 slpm for 11 minutes. The results are given in Table 1.

EXAMPLE 13

Example 9 is repeated except that the oxidant is prepared from 14.30 grams of $Fe_2O_3$ and 35.70 grams of Alcoa calcium aluminate cement and the CO feed rate is 0.954 slpm for 9 minutes. The results are given in Table 1.

EXAMPLE 14

Example 9 is repeated except that the oxidant is prepared from 12.28 grams $CeO_2$ and 37.72 grams of Alcoa calcium aluminate cement and the CO feed rate is 0.968 slpm for 7 minutes. The results are given in Table 1.

EXAMPLE 15

Example 9 is repeated except that the oxidant is prepared from 24.56 grams $CeO_2$ and 25.44 grams of Alcoa calcium aluminate cement and the CO feed rate is 1.018 slpm for 7 minutes. The results are given in Table 1.

EXAMPLE 16

Example 9 is repeated except that the oxidant is prepared from 13.62 grams $Co_3O_4$ and 36.38 grams of Alcoa calcium aluminate cement and the CO feed rate is 0.970 slpm for 10 minutes. The results are given in Table 1.

EXAMPLE 17

Example 9 is repeated except that the oxidant is prepared from 27.24 grams $Co_3O_4$ and 22.76 grams of Alcoa calcium aluminate cement and the CO feed rate is 1.013 slpm for 15 minutes. The results are given in Table 1.

EXAMPLE 18

Example 9 is repeated except that the oxidant is prepared from 11.79 grams $U_3O_8$ and 38.21 grams of Alcoa calcium aluminate cement and the CO feed rate is 0.973 slpm for 7 minutes. The results are given in Table 1.

EXAMPLE 19

Example 9 is repeated except that the oxidant is prepared from 13.88 grams $Mn_3O_4$ and 36.12 grams of Alcoa calcium aluminate cement and the CO feed rate is 0.968 slpm for 7 minutes. The results are given in Table 1.

EXAMPLE 20

Example 9 is repeated except that the oxidant is prepared from 27.29 grams $CuCr_2O_4$ and 22.71 grams of Alcoa calcium aluminate cement and the CO feed rate is 1.014 slpm for 7 minutes. The results are given in Table 1.

EXAMPLE 21

Example 9 is repeated except that the oxidant is prepared from 12.76 grams $NiFe_2O_4$ and 37.24 grams of Alcoa calcium aluminate cement and the CO feed rate is 0.977 slpm for 7 minutes. The results are given in Table 1.

EXAMPLE 22

Example 9 is repeated except that the oxidant is prepared from 12.79 grams $CoFe_2O_4$ and 37.21 grams of Alcoa calcium aluminate cement and the CO feed rate is 0.989 slpm for 11 minutes. The results are given in Table 1.

EXAMPLE 23

Example 9 is repeated except that the oxidant is prepared from 14.62 grams $Cr_2O_3$ and 35.39 grams of 0.975 slpm for 5 minutes. The results are given in Table 1.

TABLE 1

| EXAMPLE | $O_2$ CAPACITY lbs $O_2$/lb OX | $O_2$ REMOVAL RATE[A] ($\times 10^{-4}$) | METAL CONTENT WEIGHT % |
|---|---|---|---|
| 1a | 0.021 | 2.13 | 68.2 Fe* |
| 1b | 0.031 | 5.99 | 34.1 Fe* |
| 2 | 0.077 | 8.02 | 49.8 Fe* |
| 3 | 0.017 | 1.88 | 11.2 Fe |
| 4 | 0.025 | 3.81 | 18.95 Fe |
| 5a | 0.020 | 1.67 | 25.05 Fe |
| 5b | 0.029 | 4.22 | 25.05 Fe |
| 6 | 0.049 | 4.57 | 54.6 Mn, 1.9 Fe |
| 7 | 0.027 | 5.95 | 19.4 Fe, 30.8 Cr |
| 8a | 0.024 | 6.01 | 19.4 Fe, 30.8 Cr |
| 8b | 0.023 | 5.07 | 19.4 Fe, 30.8 Cr |
| 9 | 0.027 | 7.81 | 25 Cu** |
| 10 | 0.025 | 6.77 | 20 Cu |
| 11 | 0.065 | 8.03 | 20 Ni |
| 12 | 0.123 | 8.90 | 40 Ni |
| 13 | 0.040 | 7.57 | 20 Fe |
| 14 | 0.020 | 3.96 | 20.0 Ce |
| 15 | 0.017 | 4.19 | 40.0 Ce |
| 16 | 0.052 | 6.40 | 20.0 Co |
| 17 | 0.108 | 8.77 | 40.0 Co |
| 18 | 0.019 | 7.22 | 20.0 U |
| 19 | 0.022 | 6.90 | 20.0 Mn |
| 20 | 0.025 | 6.77 | 15.0 Cu |
| 21 | 0.068 | 8.54 | 18.6 Ni, Fe |
| 22 | 0.051 | 7.03 | 18.6 Co, Fe |
| 23 | 0.007 | 0.037 | 20.0 Cr |

[A]gram-atoms oxygen/gram oxidant/minute (average overtime to remove 0.015 pounds oxygen per pound oxidant)
*defluidized and agglomerated
**agglomerated From the above Examples it is readily apparent that oxidants having metal contents outside of this invention as shown in Table 1, Examples 1a, 1b, 2 and 9 agglomerate during use or have an oxygen releasability rate which is too low as shown in Examples 1a, 3, 5a and 23. As seen in Example 23 chromium is not a suitable metal for oxidants within this invention as it is deficient in oxygen capacity as well as oxygen removal rate.

In the following Examples, the reactor employed for carrying out the particular coal gasification runs comprises a 24-inch long stainless steel schedule 40 pipe with a 2.05-inch inside diameter main section fitted at the bottom with a 40 degree included angle conical section and at the top with an expanded section with a 2.5-inch inside diameter and 9½ inches long including conical joining section capped with a flange. Fluidizing gas is introduced through the bottom of the conical section of the reactor and coal is introduced at a midway point of the conical section. Gasifying agents are introduced through the top via a sparger extending the length of the reactor. Reactor gases are removed through the top for analysis. The reactor is enclosed in an insulated electric resistance heater.

EXAMPLE 24

This Example illustrates the gasification of Wyoming Sub-bituminous coal using steam as the gasifying agent and iron chromite ore from the Transvaal Mines of South Africa as the oxidant.

The reactor contains 1200 grams (75 to 350 microns) of the oxidant fluidized with nitrogen. The oxidant is maintained at a temperature of 1050° C. and a pressure of 5.0 psig. Coal (3.4 gm/min) entrained in 3.0 L/min of nitrogen is fed to the reactor along with and approximately 3.6 gm/min of water as steam as the gasifying agent. The run is continued for about 30 minutes with reaction gases periodically sampled and analyzed. The gas velocity at the coal entry is approximately 0.7 ft/sec and at the reaction gas outlet is approximately 1.2 ft/sec. The results are given in the following Table 2 where Production is the cubic feet of gas produced per pound of coal converted, Selectively is the mole percent of the carbon converted to CO and Productivity is the pounds of carbon converted per hour per cubic foot of oxidant.

TABLE 2

| TIME (min) | PRODUCTION ft³/lb | $H_2$/CO MOLE RATIO | SELECTIVITY MOLE % | PRODUCTIVITY lb/hr/ft |
|---|---|---|---|---|
| 4 | 28.3 | 0.4 | 64.8 | 13.1 |
| 6 | 39.3 | 1.1 | 73.1 | 13.7 |
| 8 | 52.9 | 2.0 | 71.9 | 12.8 |
| 10 | 44.9 | 1.4 | 77.7 | 13.0 |
| 15 | 48.6 | 1.5 | 81.9 | 12.4 |
| 20 | 51.0 | 1.5 | 86.0 | 11.8 |
| 25 | 48.9 | 1.5 | 82.6 | 12.6 |
| 30 | 49.4 | 1.6 | 81.1 | 12.5 |

EXAMPLE 25

This Example illustrates the use of oxidants of this invention in the continuous gasification of coal. Iron chromite ore is circulated at the rate of coal. Iron chromite ore is circulated at the rate of 190 gm/min through an oxidizer zone, a reducer zone and a gasifier zone. The ore-containing FeO entering the oxidizer zone is contacted with air fed to the bottom of the oxidizer zone at the rate of 11.2 L/min. Nitrogen, 8.9 L/min, is withdrawn from the top of oxidizer zone. The exothermic oxidation of FeO to $Fe_2O_3$ provides 65.8 kcal/mole of FeO oxidized and heats the ore to 1150° C. The ore-containing $Fe_2O_3$ moves to the reducer zone. Synthesis gas composed of equal volumes of $H_2$ and CO is fed into the reducer zone at the rate of 4.48 L/min. The reduction is endothermic and requires 4.6 kcal/mole of $Fe_2O_3$ reduced whereby the temperature in reducer zone is 1100° C. The reduced ore and gases flow into gasifier zone and 3.4 gm/min of finely divided coal is introduced. The gasification of the coal with the ore and steam and $CO_2$ is endothermic and requires 36.2 kcal/mole whereby the temperature in the gasifier zone is 1025° C. The reduced ore-containing FeO is withdrawn from the gasifier zone and introduced again into the oxidizer zone. The gasifier zone effluent is removed at the rate of 10.3 L/min and contains 10 mole percent $CO_2$, 1 mole percent $CH_4$, 54 mole percent CO and 35 mole percent $H_2$.

What is claimed is:

1. In the process of oxidatively gasifying carbon-containing material wherein a metal oxide-containing material is employed as heat transfer agent and oxygen carrier gas the gasification reaction, the improvement wherein said metal oxide-containing material having a releasable oxygen capacity of at least 0.015 pounds of oxygen per pound of oxidant and an oxygen removal rate of at least $3.125 \times 10^{-4}$ grams-atoms of oxygen per gram of oxidant per minute is selected from the group of (1) natural occurring iron-containing materials having an iron content of from 14 to 30 weight percent selected from bauxites, ilmenite and chromite ores, and (2) synthetic metal oxide-containing materials containing from 14 up to 25 weight percent of the metals selected from the iron and copper.

2. The process of claim 1 wherein the natural occurring iron-containing material is ilmenite.

3. The process of claim 1 wherein the natural occurring iron-containing material is an iron-chromite ore.

4. The process of claim 1 wherein the synthetic metal oxide-containing material is an iron-containing material.

5. The process of claim 1 wherein the synthetic metal oxide-containing material is a copper-containing material.

6. The process of claim 1 wherein the synthetic metal oxide-containing material is a mixture of iron oxide and calcium aluminate cement.

7. The process of claim 1 wherein the synthetic metal oxide-containing material is a mixture of copper oxide and calcium aluminate cement.

8. In the process of oxidatively gasifying carbon-containing material wherein a metal oxide-containing material is employed as heat transfer agent and oxygen carrier for the gasification reaction, the improvement wherein said metal oxide-containing material having a releasable oxygen capacity of at least 0.015 pounds of oxygen per pound of oxidant and an oxygen removal rate of at least $3.125 \times 10^{-4}$ grams-atoms of oxygen per gram of oxidant per minute is a synthetic metal oxide-containing material selected from cerium and uranium.

9. The process of claim 8 wherein the synthetic metal oxide-containing material is a cerium-containing material.

10. The process of claim 8 wherein the synthetic metal oxide-containing material is a uranium-containing material.

* * * * *

UNITED STATES PATENT AND TRADEMARK OFFICE
CERTIFICATE OF CORRECTION

PATENT NO. : 4,367,160

DATED : January 4, 1983

INVENTOR(S) : Charles W. Rooks et al

It is certified that error appears in the above-identified patent and that said Letters Patent is hereby corrected as shown below:

Column 2, line 38, delete Transuaal" and substitute therefor --Transvaal--.

Column 2, line 66, delete endorthermic" and substitute therefor --endothermic--.

Column 4, line 50, delete Porcel" and substitute therefor --Porocel--.

Column 6, line 67, after "of" insert --Alcoa calcium aluminate cement and the CO feed ate is--.

Column 7, line 27, delete overtime" and substitute --over time--.

Column 8, lines 24-25, delete "Iron chromite ore is circulated at the rate of coal.".

Column 8, Claim 1, line 55, delete "gas" and substitute therefor --for--.

Column 10, Claim 8, line 4, delete "s" from "pounds".

Signed and Sealed this

Tenth Day of January 1984

[SEAL]

Attest:

GERALD J. MOSSINGHOFF

Attesting Officer

Commissioner of Patents and Trademarks